United States Patent
Swantek et al.

(10) Patent No.: US 12,533,995 B2
(45) Date of Patent: Jan. 27, 2026

(54) BATTERY ELECTRIC VEHICLE TEMPERATURE-REGULATION SYSTEM

(71) Applicant: Illinois Tool Works Inc., Glenview, IL (US)

(72) Inventors: Andrew Swantek, Park Ridge, IL (US); Peter Quade, Walsrode, DE (US); Daniel Wenzel, Wipperfuerth, DE (US); Michael Henker, Kunshan (CN); Eric Rask, River Forest, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 18/807,115

(22) Filed: Aug. 16, 2024

(65) Prior Publication Data
US 2025/0074256 A1 Mar. 6, 2025

Related U.S. Application Data (60) Provisional application No. 63/535,593, filed on Aug. 31, 2023.

(51) Int. Cl.
*B60L 58/26* (2019.01)
*B60L 58/27* (2019.01)

(52) U.S. Cl.
CPC ............. *B60L 58/26* (2019.02); *B60L 58/27* (2019.02); *B60L 2240/485* (2013.01); *B60L 2240/545* (2013.01)

(58) Field of Classification Search
CPC .... B60L 58/26; B60L 58/27; B60L 2240/485; B60L 2240/545; B60K 11/02; B60K 11/04
See application file for complete search history.

(56) References Cited

U.S. PATENT DOCUMENTS

| | | | |
|---|---|---|---|
| 3,146,723 A | 9/1964 | Wildhaber | |
| 5,165,881 A | 11/1992 | Wicen | |
| 5,223,052 A | 6/1993 | Yamamoto | |
| 5,314,321 A | 5/1994 | Yamamoto | |
| 6,357,541 B1* | 3/2002 | Matsuda | B60K 11/02 903/905 |

(Continued)

FOREIGN PATENT DOCUMENTS

| | | |
|---|---|---|
| CN | 211 370726 | 8/2020 |
| CN | 112539171 | 3/2021 |

(Continued)

OTHER PUBLICATIONS

Int'l Search Report and Written Opinion Appln No. PCT/US2023/068194 mailed Sep. 5, 2023.

(Continued)

*Primary Examiner* — Jason D Shanske
(74) *Attorney, Agent, or Firm* — McAndrews, Held & Malloy, Ltd.

(57) ABSTRACT

An actuated valveless architecture system includes a first screw pump, a second screw pump, and a plurality of check valves. The plurality of check valves is fluidically coupled with at least one of the first screw pump and the second screw pump. The plurality of check valves is configured to define a battery loop to regulate temperature of the battery system and a drivetrain loop to regulate temperature of the drive system.

19 Claims, 8 Drawing Sheets

(56) References Cited

U.S. PATENT DOCUMENTS

| | | | |
|---|---|---|---|
| 10,920,771 B2 | 2/2021 | Böhm | |
| 11,313,333 B2 | 4/2022 | Becker | |
| 11,415,134 B2 | 8/2022 | Itou | |
| 11,549,765 B2 | 1/2023 | Hoffmann | |
| 11,852,141 B2 | 12/2023 | Metz | |
| 11,867,180 B2 | 1/2024 | Pande | |
| 11,913,370 B2 | 2/2024 | Osmun | |
| 2005/0133215 A1* | 6/2005 | Ziehr | B60L 58/27 62/238.7 |
| 2008/0031762 A1 | 2/2008 | Mosemann | |
| 2008/0080996 A1 | 4/2008 | Kataoka | |
| 2009/0016920 A1 | 1/2009 | Yamamoto | |
| 2009/0148331 A1 | 6/2009 | Kaplan | |
| 2012/0288395 A1 | 11/2012 | Wagner | |
| 2013/0116877 A1* | 5/2013 | Sabrie | H01M 16/00 165/41 |
| 2013/0183185 A1 | 7/2013 | Dirscherl | |
| 2015/0191101 A1* | 7/2015 | Rawlinson | B60L 1/003 429/62 |
| 2015/0252719 A1 | 9/2015 | Pryor | |
| 2015/0291019 A1* | 10/2015 | Hatta | B60L 1/02 429/71 |
| 2017/0182864 A1* | 6/2017 | Heyl | F25B 6/04 |
| 2018/0178615 A1* | 6/2018 | Xia | H01M 10/486 |
| 2019/0077392 A1* | 3/2019 | Fujita | F28F 27/00 |
| 2019/0120196 A1* | 4/2019 | Santoro | F02D 41/064 |
| 2020/0240411 A1 | 7/2020 | Foerster | |
| 2020/0274210 A1* | 8/2020 | Bae | H01M 10/63 |
| 2022/0344747 A1 | 10/2022 | Pawellek | |
| 2022/0381178 A1 | 12/2022 | Richard | |
| 2023/0023855 A1 | 1/2023 | Borriello | |

FOREIGN PATENT DOCUMENTS

| | | | |
|---|---|---|---|
| DE | 10051731 | 5/2002 | |
| DE | 102008064159 B3 | 1/2010 | |
| DE | 202009003980 | 8/2010 | |
| DE | 102011079226 B4 | 12/2014 | |
| DE | 102017112743 B3 | 10/2018 | |
| DE | 102017205847 A1 | 10/2018 | |
| DE | 102015218679 B4 | 8/2019 | |
| DE | 102018112492 | 10/2019 | |
| DE | 102019209115 A1 * | 12/2020 | B60K 1/00 |
| DE | 102019210873 | 1/2021 | |
| DE | 202021106860 U1 | 12/2022 | |
| DE | 202021106861 U1 | 12/2022 | |
| DE | 102021131017 A1 | 5/2023 | |
| DE | 102021133484 A1 | 6/2023 | |
| DE | 102021133495 A1 | 6/2023 | |
| EP | 1475537 B1 | 1/2007 | |
| EP | 1475536 B1 | 11/2007 | |
| EP | 2317145 | 5/2011 | |
| EP | 2423509 | 2/2012 | |
| EP | 1960671 B1 | 7/2012 | |
| EP | 2532895 | 12/2012 | |
| EP | 2916007 | 9/2015 | |
| EP | 3007330 B1 | 9/2017 | |
| EP | 3232541 B1 | 12/2018 | |
| EP | 3412865 | 12/2018 | |
| EP | 3460180 A1 | 3/2019 | |
| EP | 3232065 B1 | 1/2020 | |
| EP | 3232543 B1 | 4/2020 | |
| EP | 3812546 | 4/2021 | |
| EP | 3816419 | 5/2021 | |
| EP | 3816419 A1 | 5/2021 | |
| EP | 3816446 | 5/2021 | |
| EP | 3913187 | 11/2021 | |
| EP | 3961035 | 3/2022 | |
| EP | 3994757 A1 | 5/2022 | |
| EP | 4015769 | 6/2022 | |
| EP | 4008903 B1 | 1/2023 | |
| EP | 3899281 B1 | 3/2023 | |
| EP | 3924624 B1 | 4/2023 | |
| EP | 4198260 | 6/2023 | |
| EP | 4198261 | 6/2023 | |
| EP | 4198310 | 6/2023 | |
| EP | 4198311 | 6/2023 | |
| EP | 3994344 B1 | 7/2023 | |
| EP | 4298347 A1 | 1/2024 | |
| EP | 4298348 A1 | 1/2024 | |
| EP | 4305286 A1 | 1/2024 | |
| EP | 4367400 A1 | 5/2024 | |
| FR | 2429909 | 1/1980 | |
| FR | 2855565 | 12/2004 | |
| GB | 906430 | 9/1962 | |
| GB | 2076471 | 12/1981 | |
| JP | H01 301977 | 12/1989 | |
| JP | H0275789 | 3/1990 | |
| KR | 102658957 B1 | 4/2024 | |
| SE | 217570 | 12/1967 | |
| WO | 8605555 | 9/1986 | |
| WO | 2007030898 | 3/2007 | |
| WO | 2016202334 | 12/2016 | |
| WO | 2017186801 A1 | 11/2017 | |
| WO | 20109553 A1 | 6/2020 | |
| WO | 2021086603 | 5/2021 | |
| WO | 2023240231 A1 | 12/2023 | |
| WO | 2023240232 A1 | 12/2023 | |
| WO | 2023240234 A1 | 12/2023 | |
| WO | 2023240238 A1 | 12/2023 | |
| WO | 2023240239 A1 | 12/2023 | |
| WO | 2024115078 A1 | 6/2024 | |
| WO | 2024184527 A1 | 9/2024 | |

OTHER PUBLICATIONS

Int'l Search Report and Written Opinion Appln No. PCT/US2023/068197 mailed Oct. 30, 2023.

Int'l Search Report and Written Opinion Appln No. PCT/US2023/068200 mailed Oct. 2, 2023.

Int'l Search Report and Written Opinion Appln No. PCT/US2023/068205 mailed Sep. 29, 2023.

Int'l Search Report and Written Opinion Appln No. PCT/US2023/068206 mailed Sep. 29, 2023.

European Office Communication with extended search report Appln No. 24176065.1 dated Aug. 27, 2024.

* cited by examiner

FIG. 5a State 1

FIG. 5d State 4

FIG. 5b State 2

FIG. 5e State 5

FIG. 5c State 3

FIG. 5f State 6

BATTERY ELECTRIC VEHICLE TEMPERATURE-REGULATION SYSTEM

RELATED APPLICATION

The present application claims priority to U.S. Provisional Patent Application No. 63/535,593, filed Aug. 31, 2023, and entitled "BEV Screw Pump" which is hereby incorporated by reference in its entirety.

BACKGROUND

Traditional battery electric vehicle (BEV) temperature-regulation systems often rely on complex valve arrangements and multiple actuated switching valves to control the flow of coolant to regulate temperature in the system. These systems can be costly and inefficient, with numerous failure points and a high degree of complexity in operation and maintenance.

Temperature-regulation systems for drive components in BEVs include liquid regulation (e.g., to reallocate heat to heat and/or cool a component or system), where a water-glycol mixture circulates through the components to absorb heat, which is then dissipated via a radiator, heat exchanger, or otherwise. Air cooling directs air over the components to remove or reallocate heat, offering a simpler and lighter solution but with lower efficiency compared to liquid regulation. Advanced thermal management systems monitor component temperatures and adjust flow rates or methods to maintain optimal operating conditions.

The battery system in a BEV requires precise thermal management to ensure safety, efficiency, and longevity. Cooling methods include liquid cooling, where a coolant circulates through or around the battery cells to provide uniform and effective heat absorption, and air cooling, which forces air through the battery pack to remove heat but may lead to temperature imbalances due to less uniform cooling.

Some BEV cooling systems use phase change materials (PCMs) that absorb and release heat during phase transitions for passive thermal management. Advanced BEVs employ integrated thermal management systems that regulate the temperature of both drive and battery components, optimizing overall thermal efficiency. These systems ensure that all components operate within optimal temperature ranges, enhancing performance, efficiency, and safety.

Nevertheless, despite existing advancements, a need exists for temperature-regulation systems for more-efficiently heating or cooling of drive system and battery system components in a BEV.

SUMMARY

The present disclosure relates generally to temperature-regulation systems, substantially as illustrated by and described in connection with at least one of the figures, as set forth more completely in the claims. In one example, temperature-regulation systems for dynamic and independent cooling of drive system and battery system components in a battery electric vehicle (BEV).

DRAWINGS

The foregoing and other objects, features, and advantages of the devices, systems, and methods described herein will be apparent from the following description of particular examples thereof, as illustrated in the accompanying figures, where like or similar reference numbers refer to like or similar structures. The figures are not necessarily to scale, emphasis instead being placed upon illustrating the principles of the devices, systems, and methods described herein.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The disclosure relates to temperature-regulation systems designed for use in battery electric vehicles (BEVs) that dynamically, selectively, and independently regulate (e.g., heat or cool) the drive system and battery system components. The system uses screw pumps with check valves (i.e., one-way valves), which streamline the architecture and improves efficiency. Specifically, the subject disclosure pertains to electric vehicle cooling systems that employ screw pumps and check valves to optimize heating and cooling. The architecture utilizes the reversible flow, broadband efficiency, and pump-as-a-valve capabilities of screw pumps alongside low-cost check valves. This design omits or reduces the number of electronically actuated switching valves, simplifies control mechanisms, and enhances the overall efficiency and reliability of the temperature-regulation system.

In one example, an actuated valveless architecture system for regulating temperature in a vehicle having a battery system and a drive system comprises: a first screw pump; a second screw pump; and a plurality of check valves fluidically coupled with at least one of the first screw pump and the second screw pump, wherein the plurality of check valves, the first screw pump, and the second screw pump are configured to define a battery loop configured to regulate temperature of the battery system and a drivetrain loop configured to regulate temperature of the drive system.

In another example, an actuated valveless architecture system for regulating temperature in a vehicle having a battery system and a drive system comprises: a first screw pump; a second screw pump, wherein each of the first screw pump and the second screw pump is bidirectional, and wherein each of the first screw pump and the second screw pump is configured to be independently controlled and to alternate between an off state, a first direction, and a second direction opposite the first direction; and a plurality of check valves fluidically coupled with at least one of the first screw pump and the second screw pump, wherein the plurality of check valves, the first screw pump, and the second screw pump are configured to define a battery loop configured to regulate temperature of the battery system and a drivetrain loop configured to regulate temperature of the drive system.

In some examples, each of the plurality of check valves is a passive valve.

In some examples, the first screw pump and the second screw pump are configured to be independently controlled and to alternate between an off state, a first direction, and a second direction opposite the first direction.

In some examples, the actuated valveless architecture system further comprises a chiller.

In some examples, the battery loop includes the chiller.

In some examples, the drivetrain loop includes a radiator.

In some examples, the actuated valveless architecture system further comprises a chiller and a radiator. The first screw pump and the second screw pump are configured to direct coolant flow selectively through the chiller and the radiator.

In some examples, the actuated valveless architecture system further comprises a positive temperature coefficient (PTC) heater. For example, the battery loop can include the PTC heater.

In some examples, the plurality of check valves comprises a first check valve, a second check valve, a third check valve, and a fourth check valve. The actuated valveless architecture system further comprises a radiator and a chiller. For example, the first check valve can be configured to prevent coolant backflow from the radiator to the first screw pump. The second check valve can be configured to prevent coolant flow from the first screw pump and divert coolant through the first check valve toward the radiator. The third check valve can be configured to prevent coolant backflow from the chiller toward the second screw pump. The fourth check valve can be configured to prevent coolant flow from the second screw pump and divert coolant through the third check valve toward the chiller.

In some examples, the first screw pump and the second screw pump are configured, via one or more check valves of the plurality of check valves, to restrict flow through the drive system to one-way flow.

In some examples, the first screw pump and the second screw pump are configured to be controlled via a control system having a processor operatively coupled to a memory device.

In some examples, the control system is configured to employ artificial intelligence (AI) to monitor and control one or both of the first screw pump and the second screw pump.

An objective of this disclosure is to streamline BEV temperature-regulation system architectures by dynamically, selectively, and independently regulating temperatures (e.g., to cool or to heat) the drive system and battery system components using screw pumps and check valves. By reducing the total number of electronically actuated switching valves and minimizing the need for proportionally controlled valves, the system controls fluid temperature through flow rate rather than fluid mixing, enhancing overall efficiency and reliability.

The disclosed temperature-regulation system comprises various cooling-system architectures that capture key functional modes typical of advanced BEV designs. The primary components of the system include screw pumps and check valves, each contributing unique features to optimize cooling.

Screw pumps offer reversible flow to allow directional swapping of coolant, which balances cell-to-cell temperature variations and extends battery pack life and capacity retention. Their broadband efficiency enables operation across a range of flow rates, reducing the need for proportional valves. Additionally, screw pumps act as valves when off, minimizing flow and prohibiting fluid movement.

The screw pumps provide the primary mechanism for coolant flow and control, leveraging their reversible flow and broadband efficiency, while the check valves control the flow path within the cooling system based on the pump's direction, using various opening pressures to create different system states.

The present disclosure describes architectures to provide actuated valveless architecture (AVA) systems and actuated valveless architecture, isolated loop (AVAIL) systems. The AVA and AVAIL systems are actuated valveless in that they don't require actuated valves to control coolant flow throughout the system, instead using a set of screw pumps and, in most cases, passive check valves.

FIGS. 1 through 6 illustrate architecture examples for the AVA system 100, which utilize screw pumps and check valves without the need for actuated switching valves. As will be appreciated, coolant flow direction and speed are controlled by the screw pumps, simplifying overall system control. This architecture reduces the complexity and cost of the temperature-regulation system while maintaining efficient cooling of both the drive and battery system components.

Figure 1:
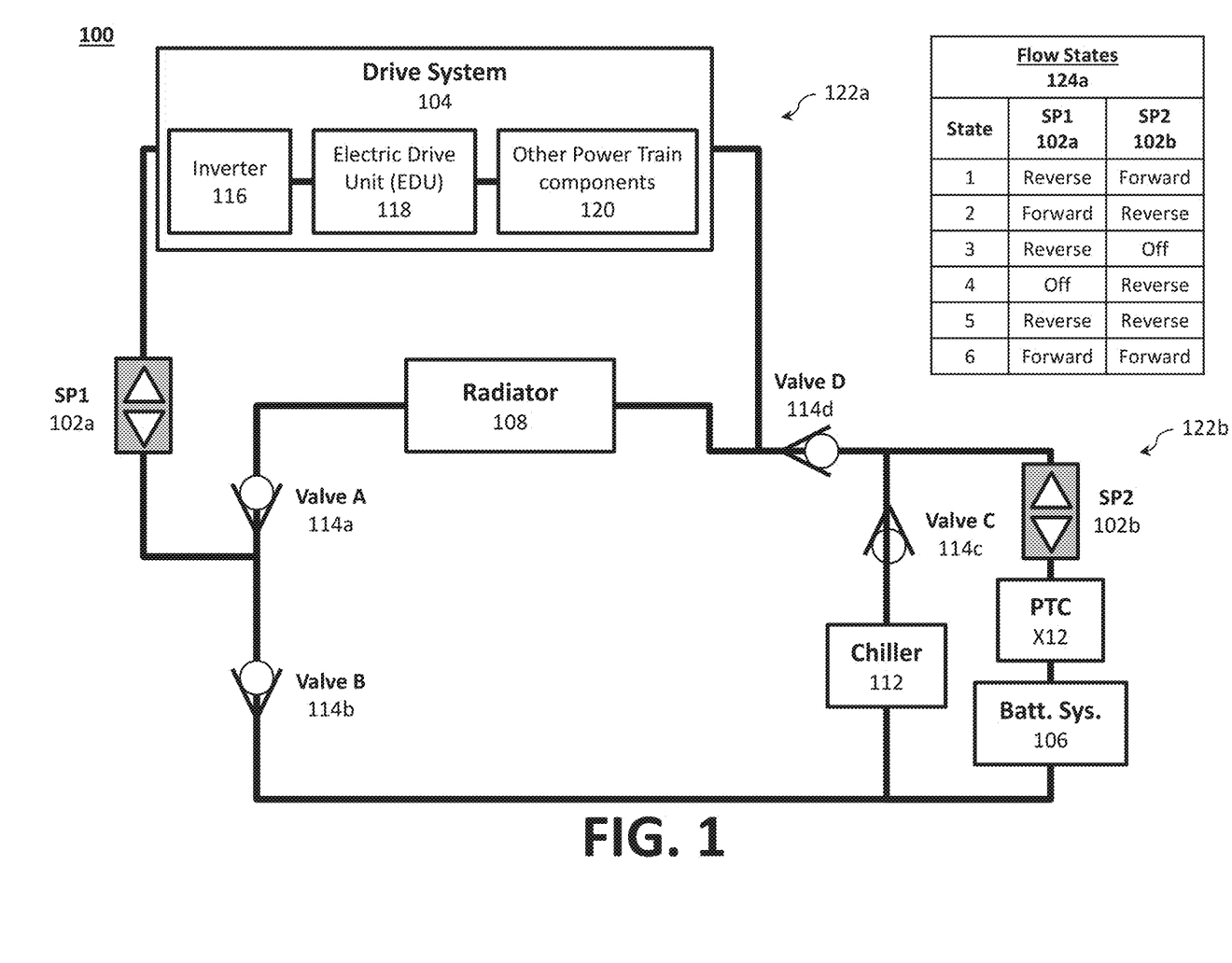
FIG. 1 illustrates a system architecture for the actuated valveless architecture (AVA) system in accordance with a first example, in accordance with an aspect of this disclosure.

FIG. 1 illustrates a system architecture for the AVA system 100 in accordance with a first example. The AVA system 100 is designed to improve the efficiency and control of the cooling system in battery electric vehicles (BEVs) by utilizing screw pumps. The illustrated AVA system 100 includes a first screw pump (SP1) 102a and a second screw pump (SP2) 102b. The first screw pump (SP1) 102a and the second screw pump (SP2) 102b facilitate operation of the AVA system 100, as they are responsible for circulating the coolant fluid through various BEV components. The first screw pump (SP1) 102a and the second screw pump (SP2) 102b can be independently controlled to direct the flow of coolant in either a first direction or a second direction, providing flexibility and precision in managing the thermal conditions within the BEV.

Control of the first screw pump (SP1) 102a and the second screw pump (SP2) 102b is achieved through a control system (e.g., the BEV's electric vehicle control module (VCU)), which is typically equipped with a processor that is operatively coupled to a memory device. This configuration allows for precise and independent management of each of the first screw pump (SP1) 102a and the second screw pump (SP2) 102b, enabling the AVA system 100 to respond dynamically to the thermal needs of the BEV. For example, the processor executes software (e.g., that provided instructions and/or algorithms) stored in the memory device to adjust the flow rate and direction of the coolant based on real-time data from temperature sensors placed throughout the BEV.

In this example, the BEV components of the AVA system 100 include a drive system 104, a battery system 106, a radiator 108, a positive temperature coefficient (PTC) heater 110, a chiller 112, and a plurality of check valves 114, more specifically, in this example, a first check valve 114a, a second check valve 114b, a third check valve 114c, and a fourth check valve 114d.

The drive system 104 comprises an inverter 116, an electric drive unit (EDU) 118, and other powertrain components 120. The inverter 116 converts the direct current (DC) electricity stored in the battery pack into alternating current (AC) electricity required by the electric motor. The inverter 116 also controls the speed and torque of the motor by adjusting the frequency and amplitude of the AC power supplied to the motor. The EDU 118 includes, for example, the power electronics, the gearbox, and the electric motors.

The radiator 108 and the chiller 112 are each capable of chilling components of the AVA system 100. The radiator 108 is used to dissipate heat from the components of the AVA system 100. Unlike traditional internal combustion engine vehicles, where the radiator primarily cools the engine, in EVs, the radiator helps maintain optimal operating temperatures for the electric drivetrain components (e.g., the drive system 104). Similarly, the chiller 112 is configured to regulate the temperature of various critical components. The chiller 112 can use a refrigerant-based cooling system to absorb and dissipate heat, ensuring that these components operate within their optimal temperature ranges to maintain performance, efficiency, and longevity.

In some examples, it is desirable to use one of the radiator 108 or the chiller 112 over the other. For example, while very effective at cooling a component, the chiller 112 requires more power to operate as compared to the radiator 108. Thus, while the chiller 112 would more quickly cool a component, it would also more quickly consume power and/or deplete the batteries of the BEV. Accordingly, it would be more desirable to use the radiator 108 instead of the chiller 112 when the radiator 108 can sufficiently cool the component. Conversely, where the radiator 108 would be inadequate, the chiller 112 can be used at the expense of added power consumption.

Conversely, the PTC heater 110 can be used to heat the components of the AVA system 100 (e.g., to heat the battery system 106, where needed). PTC heaters 110 are typically made from materials that increase in resistance as they heat up; a self-regulating property that enables the PTC heater 110 to provide consistent and safe heating without the risk of overheating.

Check valves 114, also known as a non-return valves or one-way valves, refer to a mechanical device that allows fluid to flow through it in only one direction. Check valves 114 are designed to prevent backflow at various points in the AVA system 100, ensuring that the fluid flows in the desired direction and not backward. The check valves 114, unlike actuated valves, operate automatically and do not require any external control or manual operation. Therefore, each of the plurality of check valves 114 can be described as a passive check valve, meaning that it does not require power or a control system to be actuated.

The BEV components are arranged with the first screw pump (SP1) 102a and the second screw pump (SP2) 102b to define two coolant flow loops: a drivetrain loop 122a configured to regulate temperature of the drive system 104, and a battery loop 122b configured to regulate temperature of the battery system 106. This dual-loop configuration allows for targeted cooling, ensuring that both the drive system and battery system are maintained within optimal temperature ranges.

Each of the first screw pump (SP1) 102a and the second screw pump (SP2) 102b is configured to switch between an off state (i.e., undriven with no flow or substantially no flow), a first direction (e.g., a forward direction), and a second direction (e.g., reverse direction). The flow-reversing capability allows for alternating the flow of coolant through the drivetrain loop 122a and/or the battery loop 122b, resulting in six distinct flow states as summarized in table 124a. The ability of the first screw pump (SP1) 102a and the second screw pump (SP2) 102b to reverse the flow direction of the coolant flow enhances the flexibility of the AVA system 100, enabling it to address specific thermal requirements and balance the temperature across different components more effectively.

By employing screw pumps 102a, 102b that can reverse flow and act as valves when in the off state, the AVA system 100 eliminates the need for multiple electronically actuated switching valves. This reduction in components simplifies the overall system architecture, lowering both the complexity and the cost of the temperature-regulation system. Additionally, the efficiency of the second screw pumps 102a, 102b allows them to operate effectively across a wide range of flow rates, which minimizes the necessity for proportionally controlled valves and further streamlines the AVA system 100.

The screw pumps 102a, 102b serve to deliver a highly efficient and cost-effective solution for managing the thermal conditions in BEVs. The independent control of the screw pumps 102a, 102b, combined with the strategic use of check valves and dual coolant flow loops (e.g., the drivetrain loop 122*a* and/or the battery loop 122*b*), enable precise and reliable cooling.

In other words, the various check valves 114 are configured to prevent coolant backflow and/or to direct coolant flow to specific components to achieve one of a plurality of flow states, such as the six distinct flow states as summarized in table 124*a*. In this example, the first check valve 114*a* is configured to prevent coolant backflow from the radiator 108 to the first screw pump (SP1) 102*a*. The second check valve 114*b* is configured to prevent coolant flow from the first screw pump (SP1) 102*a*, thereby diverting coolant through the first check valve 114*a* toward the radiator 108. The third check valve 114*c* is configured to prevent coolant backflow from the chiller 112 toward the second screw pump (SP2) 102*b*. The fourth check valve 114*d* is configured to prevent coolant flow from the second screw pump (SP2) 102*b*, thereby diverting coolant through the third check valve 114*c* toward the chiller 112.

FIGS. 2*a* through 2*f* illustrate the various flow states of the AVA system 100 as shown in FIG. 1. Throughout these figures, solid flow lines represent an active flow condition within the channel, dotted flow lines indicate a no-flow condition, and dashed flow lines denote channels where flow is combined and passes through the same pathway. The AVA system 100 can operate in the six distinct flow states as summarized in table 124*a*. In these example flow diagrams, the PTC heater 110 is again omitted from the figures between the second screw pump 102*b* and battery system 106 for illustrative purposes.

Figure 2A:
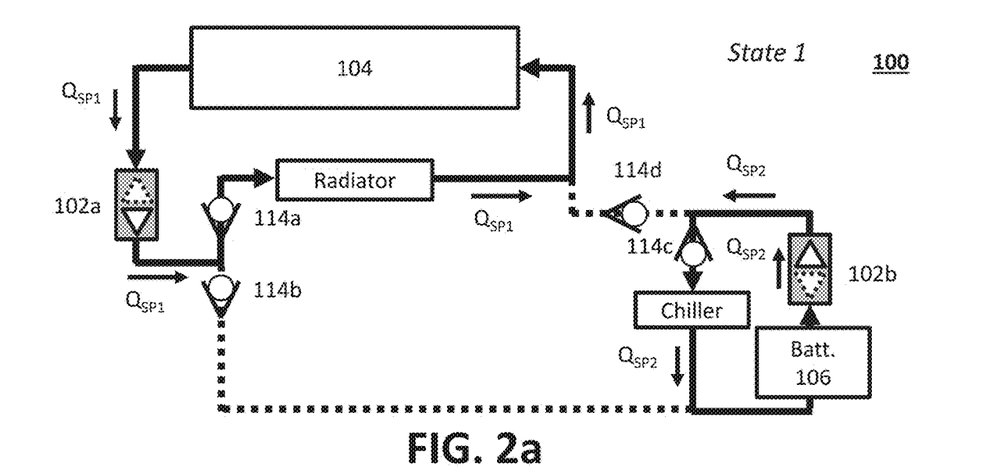
FIGS. 2a through 2f illustrate the various flow states of the AVA system as shown in FIG. 1.

FIG. 2*a* illustrates the AVA system 100 in flow state 1, where the first screw pump (SP1) 102*a* operates in reverse, while the second screw pump (SP2) 102*b* operates in forward. In this state, the drivetrain loop 122*a* and the battery loop 122*b* are fluidically isolated. The flow rates of the drivetrain loop 122*a* and the battery loop 122*b* do not need to be equal. This configuration can be utilized to provide specific temperature regulation for the battery system 106, ensuring optimal thermal conditions without interference from the drivetrain loop.

Figure 2B:
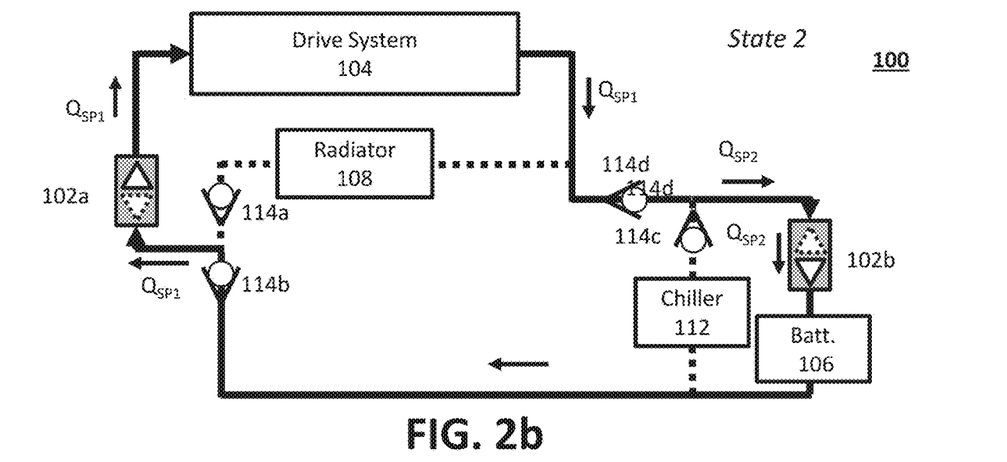

FIG. 2*b* illustrates the AVA system 100 in flow state 2, where the configuration is reversed compared to flow state 1, with first screw pump (SP1) 102*a* in forward and second screw pump (SP2) 102*b* in reverse. In this state, the waste heat from powertrain loop 122*a* can be recovered and directed to or used by battery system 106. The flow rates between the two loops should be matched. If the flow rate ($Q_{SP1}$) of the first screw pump exceeds the flow rate ($Q_{SP2}$) of the second screw pump, additional flow is directed through the chiller 112. Conversely, if $Q_{SP1}$ is less than $Q_{SP2}$, excess flow is managed through both the chiller 112 and potentially the radiator 108.

Figure 2C:
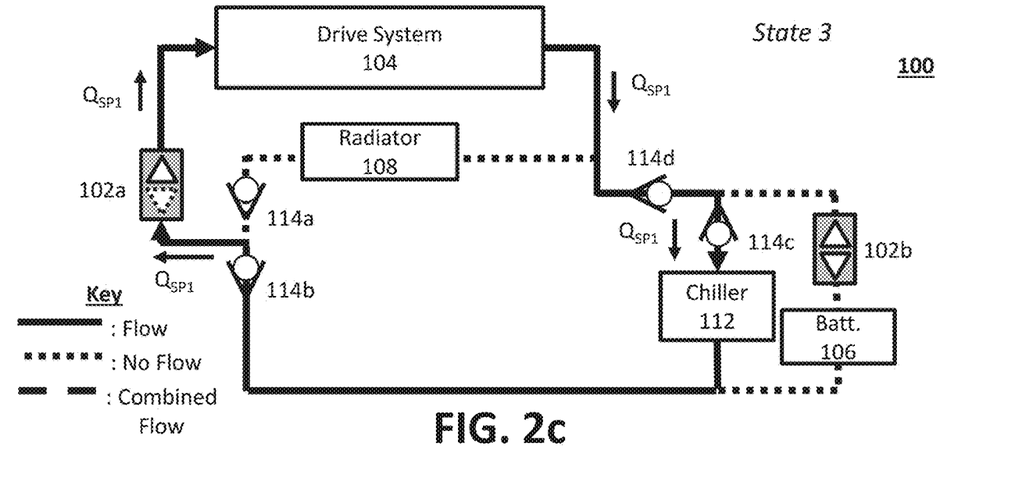

FIG. 2*c* illustrates flow state 3, where the first screw pump (SP1) 102*a* is in reverse, while the second screw pump (SP2) 102*b* is in the off state. In this state, waste heat is recovered from the drive system 104 via the chiller 112. This state requires the battery system 106 to be at an optimal temperature. It can be used to preheat the coolant before recovering waste heat to the battery system 106 with the chiller 112 shut off. Where desired, a 4-port, 2-state actuated valve can be integrated to heat the battery system 106 in parallel using the PTC heater 110.

Figure 2D:
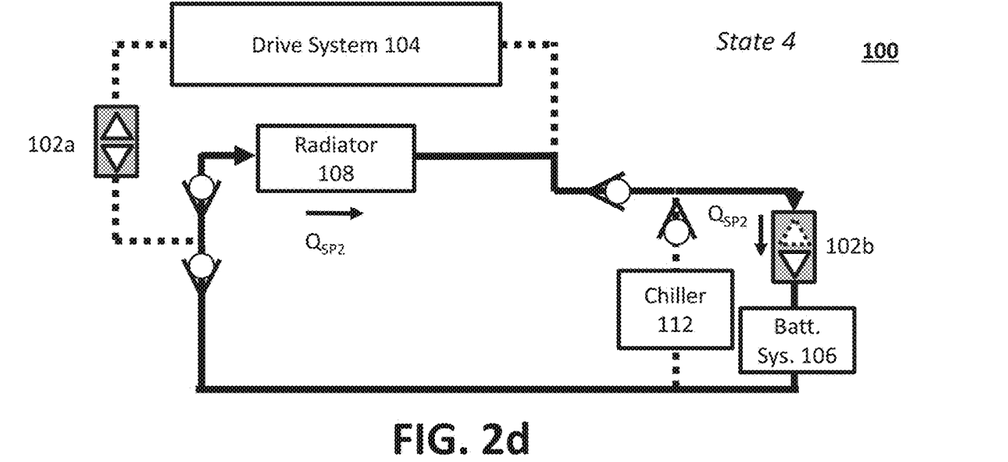

FIG. 2*d* illustrates flow state 4, where the first screw pump (SP1) 102*a* is in the off state, while the second screw pump (SP2) 102*b* is in reverse. In this state, the battery system 106 can be cooled via radiator 108. This state is advantageous when the ambient temperature is cooler than the battery system 106, the battery of the battery system 106 has completed fast charging, and there is no demand for cabin heating.

Figure 2E:
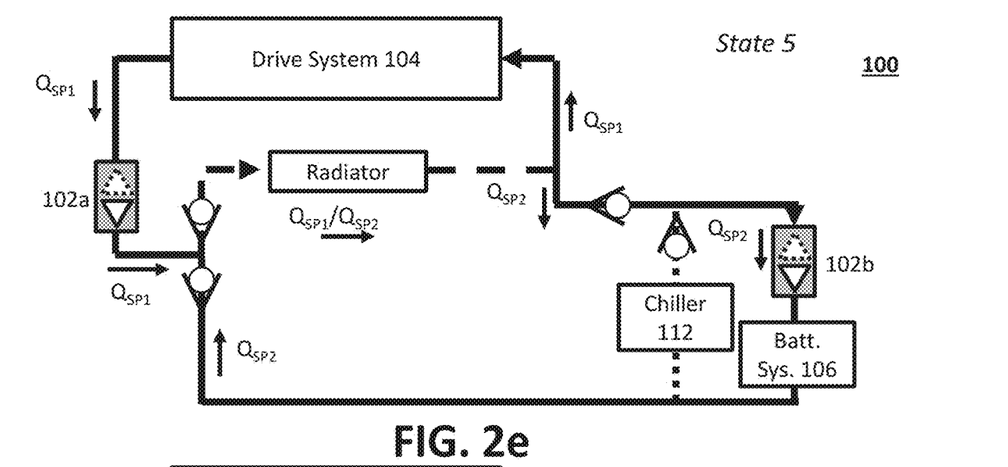

FIG. 2*e* illustrates flow state 5, where both the first screw pump (SP1) 102*a* and the second screw pump (SP2) 102*b* are in reverse. In this state, the radiator 108 is used to cool the battery system 106 and drive system 104. This state can be used for mixing or proportional control to manage the temperature effectively.

Figure 2F:
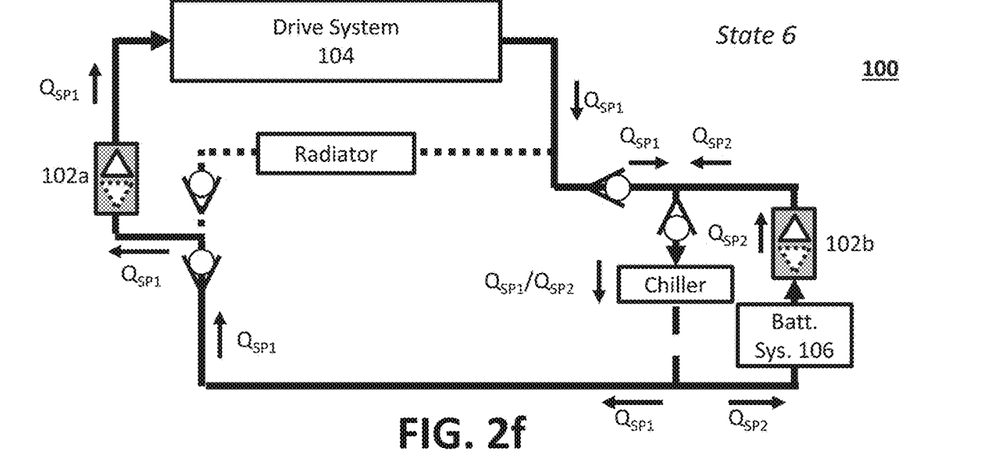

FIG. 2*f* illustrates flow state 6, where both the first screw pump (SP1) 102*a* and the second screw pump (SP2) 102*b* are in forward. In this state, the chiller 112 is used to cool the battery system 106 and drive system 104. Similar to state 5, this state may involve mixing or proportional control to achieve the desired thermal management for the battery system 106 and the EDU 118.

These various flow states collectively demonstrate the flexibility and efficiency of the AVA system 100 in managing the thermal requirements of a BEV. By leveraging the independent control of screw pumps and the strategic use of check valves, the system can dynamically adjust to various operating conditions, thereby optimizing the performance and longevity of the vehicle's components.

In some instances, it is desirable to direct coolant fluid through the drive system 104 in a particular direction. For example, it can be desirable to cool the inverter 116 prior to the other components, such as the EDU 118 and other powertrain components 120. To that end, FIG. 3 illustrates a variation of the AVA system 100 where coolant flows through the drive system 104 in a particular direction and, as such, is restricted to a one-way flow through the drive system 104.

Figure 3:
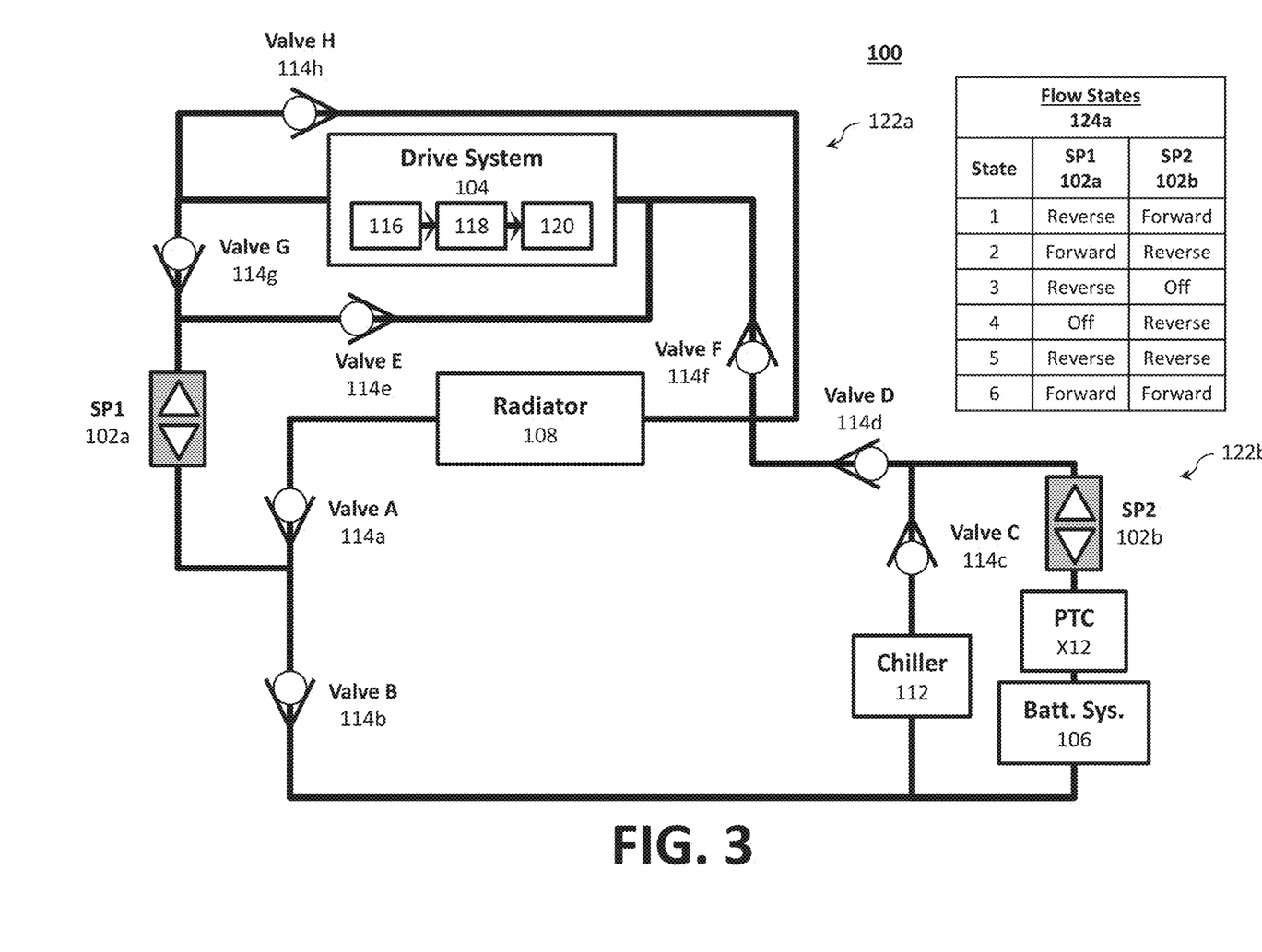
FIG. 3 illustrates a system architecture for the AVA system in accordance with a second example.

FIG. 3 illustrates a system architecture for the AVA system 100 in accordance with a second example. The AVA system 100 of FIG. 3 is substantially the same as the AVA system 100 of FIG. 1, except for the addition of four additional check valves 114, illustrated as a fifth check valve 114*e*, a sixth check valve 114*f*, a seventh check valve 114*g*, an eighth check valve 114*h*.

The four additional check valves 114*e*, 114*f*, 114*g*, 114*h* are positioned around the drive system 104 to restrict flow through the drive system 104 starting at the inverter 116 (left to right in FIG. 3). The fifth check valve 114*e* is configured to prevent coolant flow from the first screw pump (SP1) 102*a* from flowing into the drive system 104 at an end opposite the inverter 116. The sixth check valve 114*f* is configured to prevent coolant flow from the radiator 108 from flowing into the drive system 104 at an end opposite the inverter 116. The seventh check valve 114*g* is configured to direct coolant flow from the radiator 108 into the drive system 104 at an end at the inverter 116. The eighth check valve 114*h* is configured to direct coolant flow from the first screw pump (SP1) 102*a* into the drive system 104 at an end at the inverter 116.

The AVA system 100 can operate in six distinct flow states, substantially the same as those described in connection with FIGS. 2*a* through 2*f*, except that coolant flow is restricted to a one-way flow through the drive system 104—in this example, starting at the end with the inverter 116. In flow state 1, the powertrain loop 122*a* and the battery loop 122*b* are isolated from each other. In flow state 2, waste heat from the powertrain loop 122*a* is recovered and directed to the battery system 106 for thermal management. In flow state 3, waste heat from the powertrain loop 122*a* is recovered and processed via the chiller 112 to maintain optimal temperatures. In flow state 4, the battery system 106 is cooled through the radiator 108, ensuring efficient thermal regulation. In flow state 5, both the drive system 104 and the battery system 106 are simultaneously cooled using the radiator 108, providing comprehensive cooling. Finally, in flow state 6, both the drive system 104 and the battery system 106 are cooled using the chiller 112, optimizing the thermal management of these critical components.

Figure 4:
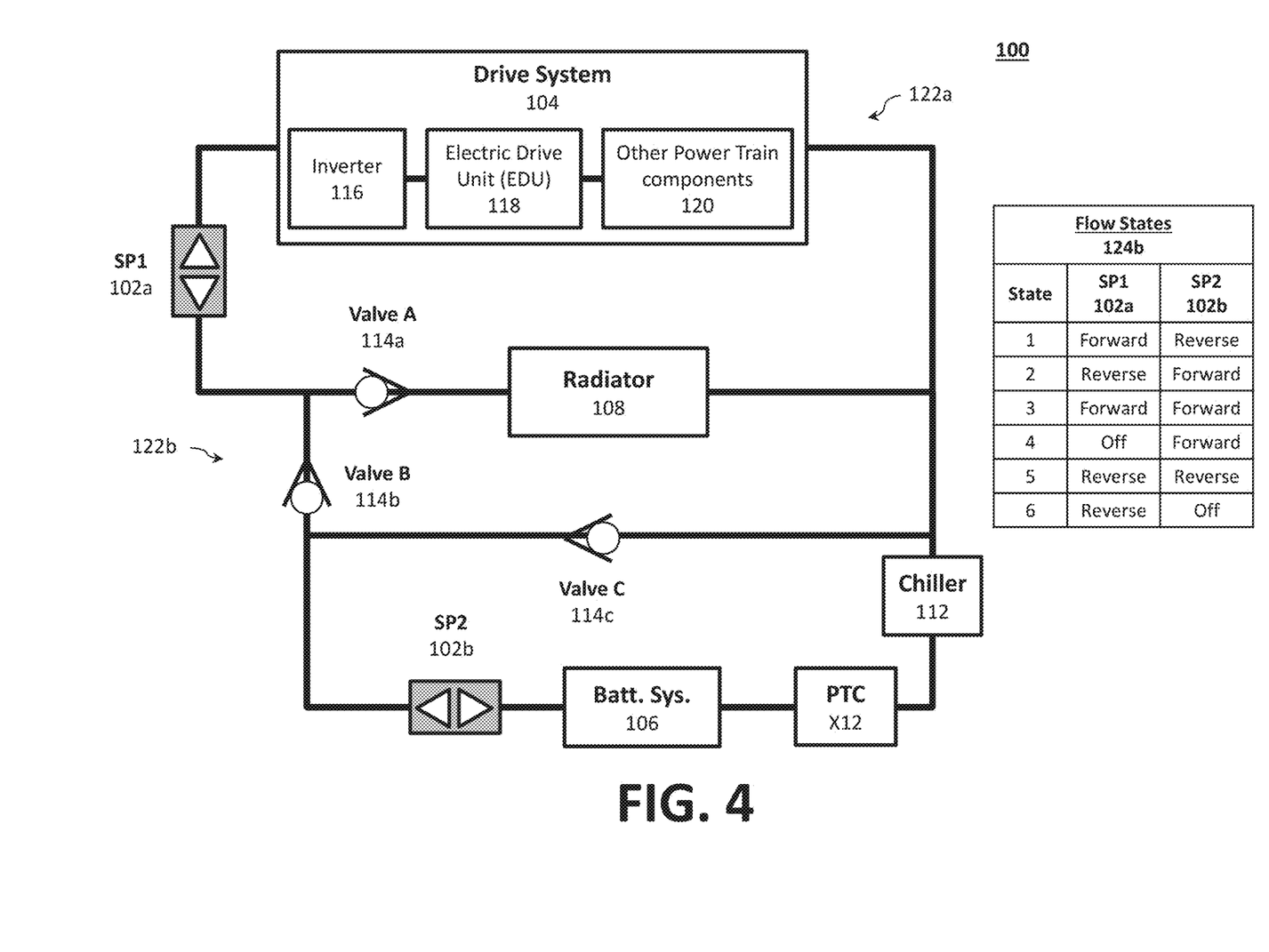
FIG. 4 illustrates a system architecture for the AVA system in accordance with a third example.

FIG. 4 illustrates a system architecture for the AVA system 100 in accordance with a third example. The AVA system 100 of FIG. 4 is substantially the same as the AVA system 100 of FIG. 1, except for the rearrangement of check valves 114*a*, 114*b*, 114*b* and the omission of a check valve (e.g., check valve 114*d*), thus reducing cost and complexity.

The illustrated AVA system 100, therefore, includes a first screw pump (SP1) 102*a*, a second screw pump (SP2) 102*b*, a drive system 104, a battery system 106, a radiator 108, a chiller 112, and a plurality of check valves 114, more specifically, in this example, a first check valve 114*a*, a second check valve 114*b*, and a third check valve 114*c*. In this example, the first check valve 114*a* is configured to prevent coolant flow into the radiator 108 from the first screw pump (SP1) 102*a*. The second check valve 114*b* is configured to prevent coolant flow from the second screw pump (SP2) 102*b* toward the first screw pump (SP1) 102*a*, thus diverting coolant flow through the third check valve 114*c* and toward the chiller 112. The third check valve 114*c* is configured to prevent coolant backflow from the radiator 108, drive system 104, and chiller 112.

FIGS. 5*a* through 5*f* illustrate the various flow states of the AVA system 100 as shown in FIG. 4. Throughout these figures, solid flow lines represent an active flow condition within the channel, dotted flow lines indicate a no-flow condition, and dashed flow lines denote channels where flow is combined and passes through the same pathway. The AVA system 100 can operate in the six distinct flow states as summarized in table 124*b*. In these example flow diagrams, the PTC heater 110 is again omitted from the figures between the second screw pump 102*b* and battery system 106 for illustrative purposes.

Figure 5A:
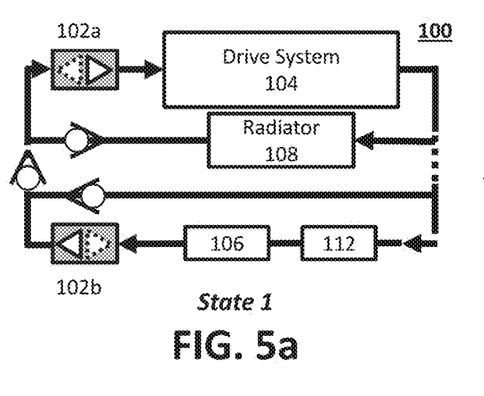
FIGS. 5a through 5f illustrate the various flow states of the AVA system as shown in FIG. 4.

FIG. 5*a* illustrates the AVA system 100 in flow state 1, where the first screw pump (SP1) 102*a* is in the forward state, while the second screw pump (SP2) 102*b* is in the reverse state. In this state, the drivetrain loop 122*b* and battery loop 122*b* are isolated. It is possible that there could be some coolant flow from the battery loop 122*b* of the battery system 106 to the radiator 108, and then back into the battery loop 122*b* if the pressures between the two loops 122*a*, 122*b* are sufficiently different.

Figure 5B:
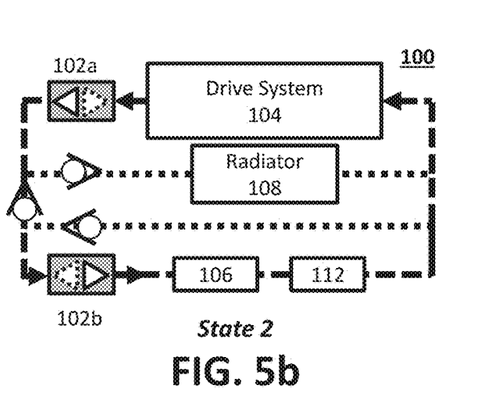

FIG. 5*b* illustrates the AVA system 100 in flow state 2, where the first screw pump (SP1) 102*a* is in the reverse state, while the second screw pump (SP2) 102*b* is in the forward state. In this state, waste heat from drive system 104 is recovered and directed to battery system 106. In this state, waste heat could also be directed to a cabin (whether for passenger or cargo) of the BEV via the chiller 112 or to cool everything via the chiller 112, depending on the refrigerant side.

Figure 5C:
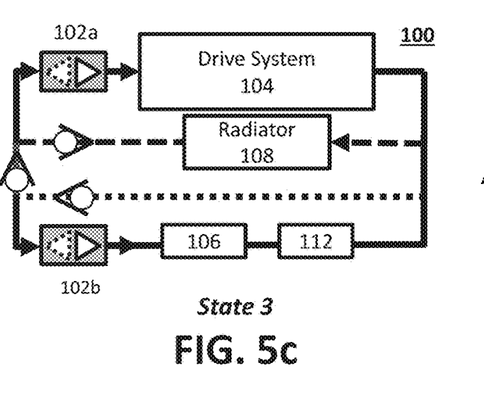

FIG. 5*c* illustrates the AVA system 100 in flow state 3, where the first screw pump (SP1) 102*a* and the second screw pump (SP2) 102*b* are in the first state. In this state, drive system 104 and the battery system 106 are cooled via the radiator 108. Temperature of the coolant fluid can be regulated by independently changing or adjusting the flow rates of the first screw pump (SP1) 102*a* and/or the second screw pump (SP2) 102*b*

Figure 5D:
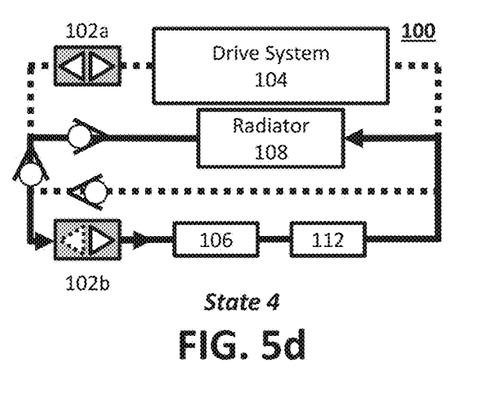

FIG. 5*d* illustrates the AVA system 100 in flow state 4, where the first screw pump (SP1) 102*a* is the off state (i.e., undriven with substantially no flow), while the second screw pump (SP2) 102*b* is in the forward state. In this state, the battery system 106 is cooled via the radiator 108.

Figure 5E:
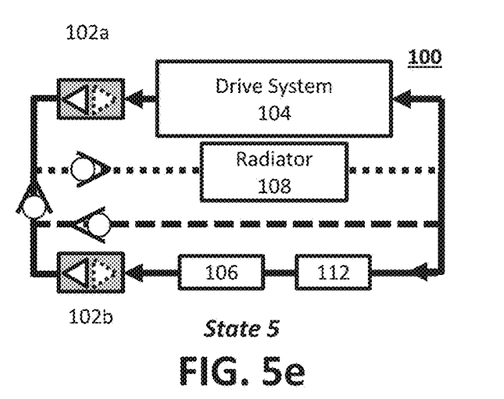

FIG. 5*e* illustrates the AVA system 100 in flow state 5, where the first screw pump (SP1) 102*a* and the second screw pump (SP2) 102*b* are in the reverse state. In this state, the battery system 106 and drive system 104 are configured to mix coolant flow. For example, as with a prior state, temperature of the coolant fluid can be regulated by independently changing or adjusting the flow rates of the first screw pump (SP1) 102*a* and/or the second screw pump (SP2) 102*b*.

Figure 5F:
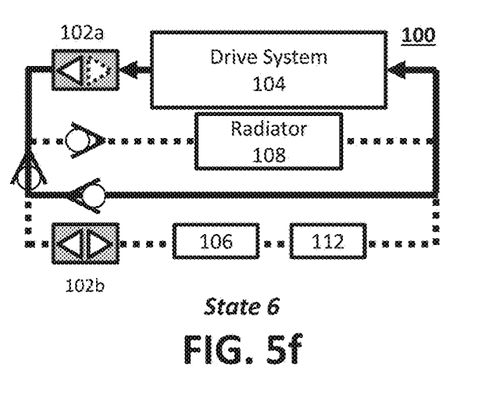

FIG. 5*f* illustrates the AVA system 100 in flow state 6, where the first screw pump (SP1) 102*a* is in the reverse state, while the second screw pump (SP2) 102*b* is in the off state. In this state, heat from the drive system 104 can be stored, if desired.

Figure 6:
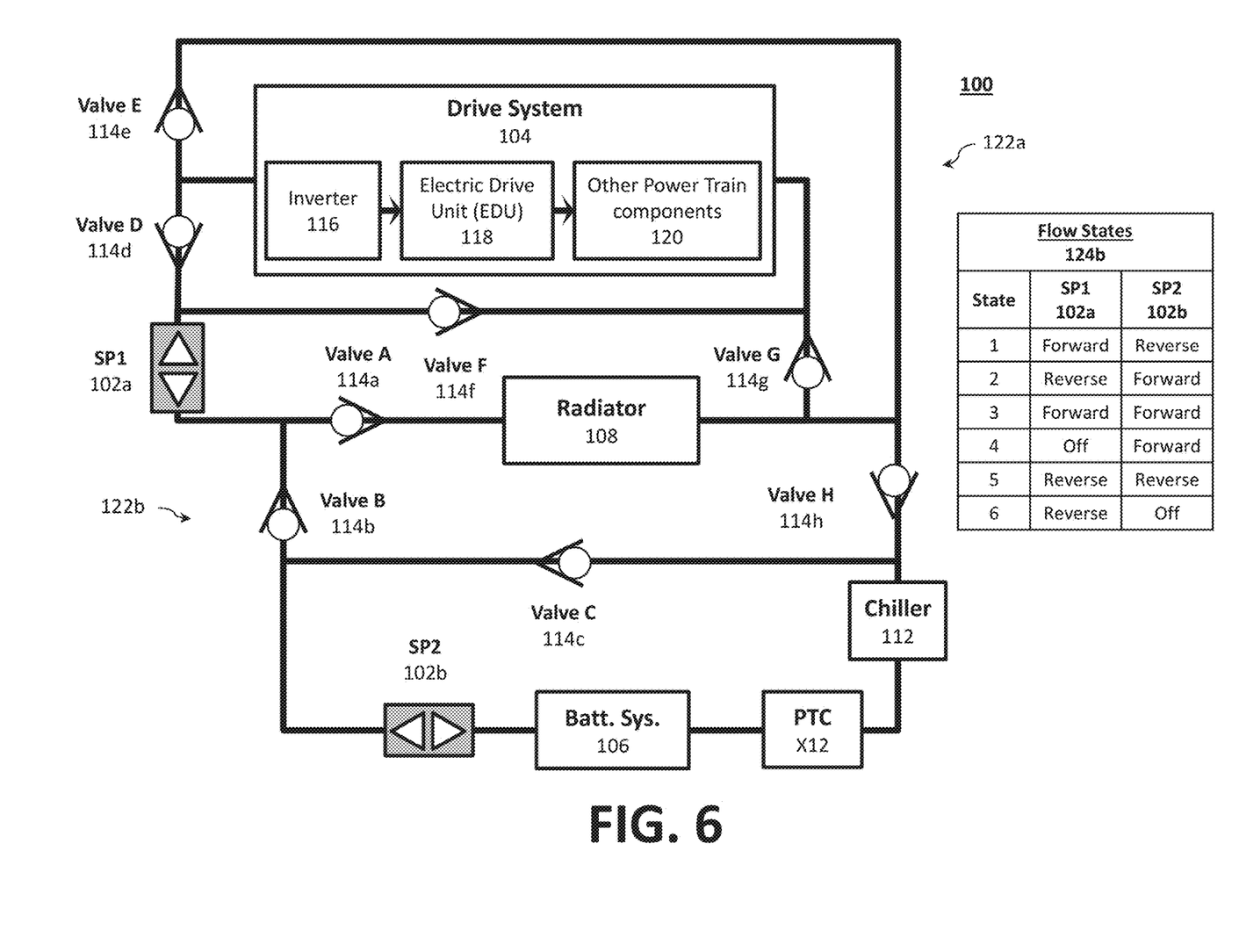
FIG. 6 illustrates a system architecture for the AVA system in accordance with a fourth example.

FIG. 6 illustrates a system architecture for the AVA system 100 in accordance with a fourth example. The AVA system 100 of FIG. 6 is substantially the same as the AVA system 100 of FIG. 4, except for the addition of five additional check valves that are configured to restrict flow to a one-way flow through the drive system 104—in this example, starting at the end with the inverter 116. The five additional check valves are illustrated as a fourth check valve 114*d*, a fifth check valve 114*e*, a sixth check valve 114*f*, a seventh check valve 114*g*, and an eighth check valve 114*h*.

The five additional check valves are positioned around the drive system 104 to restrict flow through the drive system 104 starting at the inverter 116 (left to right in FIG. 6). The fourth check valve 114*d* is configured to prevent coolant flow from the first screw pump (SP1) 102*a* into the drive system 104 at an end opposite the inverter 116 and to direct coolant flow to into the drive system 104 at the inverter 116. The fifth check valve 114*e* is configured to prevent coolant flow from the first screw pump (SP1) 102*a* into the drive system 104 at an end opposite the inverter 116. The sixth check valve 114*f* is configured to prevent coolant flow from the first screw pump (SP1) 102*a* into the drive system 104 at an end opposite the inverter 116. The seventh check valve 114*g* is configured to direct coolant flow from the radiator 108 into the drive system 104 at an end at the inverter 116. The eighth check valve 114*h* is configured to direct coolant flow from the drive system 104 to the chiller 112 and to direct coolant flow through the radiator. The AVA system 100 can operate in the six distinct flow states as summarized in table 124*b* and described previously in connection with FIGS. 5*a* through 5*f*, except that flow through the drive system 104 is one-way.

Figure 7:
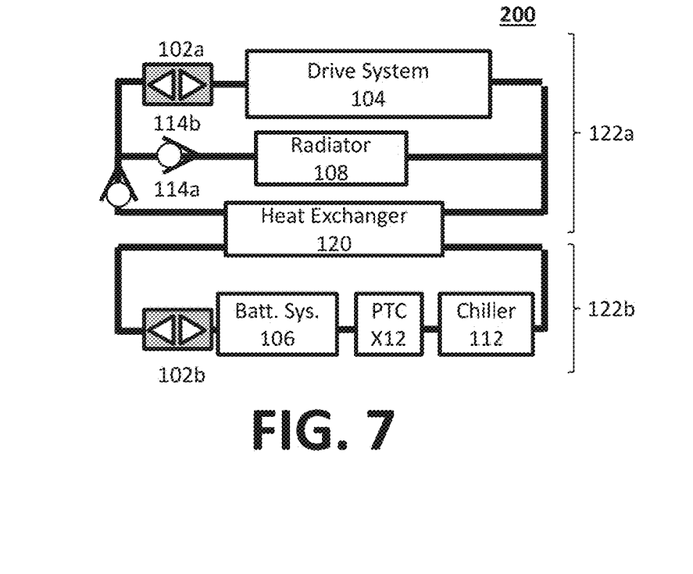
FIG. 7 illustrates a version of an actuated valveless architecture, isolated loop (AVAIL) system where the drivetrain loop and battery loop are isolated by a heat exchanger.
Figure 8:
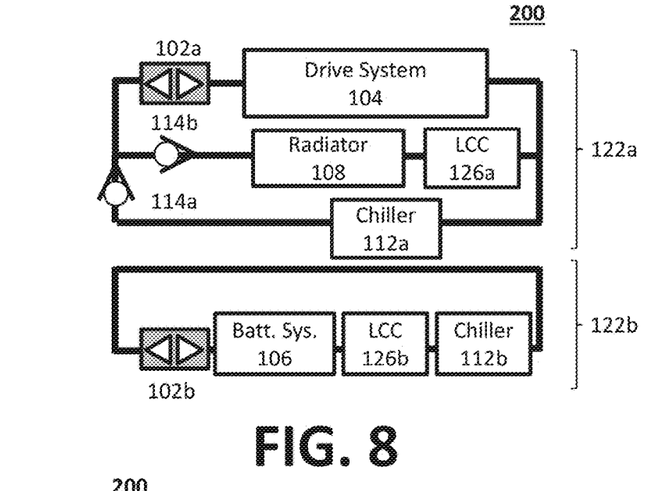
FIG. 8 illustrates a version of the AVAIL system using LCC systems, which employ a liquid coolant to manage heat dissipation.
Figure 9:
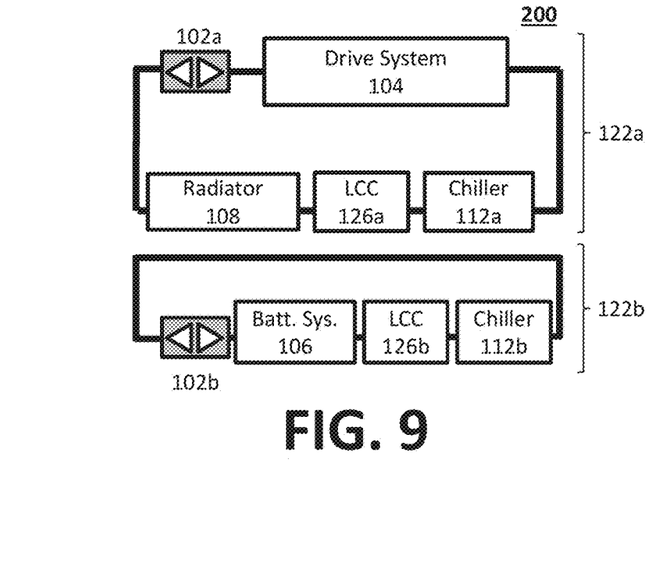
FIG. 9 illustrates a version of the AVAIL system using a separate loop for each of the drive system and battery system.

FIGS. 7 through 9 illustrate architectural variations of the AVAIL system 200. The AVAIL system 200 is similar to the above-described AVA systems 100, but features isolated flow loops for the drive system and battery system, incorporating a heat exchanger (potentially a mixing chamber) to manage thermal exchange between the drivetrain loop 122*a* and battery loop 122*b*. Similar to the AVA system but with isolated coolant loops, it further optimizes temperature control and efficiency, enhancing the precision of cooling and temperature management, and providing superior thermal regulation for both system components.

The AVAIL system 200 employs many of the same components as the prior AVA system 100, such as first screw pump (SP1) 102*a* and second screw pump (SP2) 102*b*. These screw pumps facilitate the operation of the AVA system 100 by circulating the coolant fluid through various BEV components, such as the drive system 104, the battery system 106, the radiator 108, the PTC heater 110 (in some cases), a chiller 112, and, depending on the design, one or more check valves (e.g., the first and second check valves 114a, 114b as shown in FIGS. 7 and 9). In the examples shown in FIGS. 8 and 9, one or more liquid cooled condenser (LCC) systems are employed.

FIG. 7 illustrates a version of the AVAIL system 200 where the drivetrain loop 122a and battery loop 122b are isolated by a heat exchanger 128. Using this architecture, the AVAIL system 200 can reverse the battery system 106 flow as needed to balance the temperature profile of the battery system 106, reducing cell pack degradation due to cell-to-cell variation. The heat exchanger 128 provides coolant-to-coolant heat exchange, allowing for flow rates to be independently controlled via the first screw pump (SP1) 102a and second screw pump (SP2) 102b. In some examples, the heat exchanger 128 can be a conductive polymer heat exchanger or a mixing chamber. Additionally, the separation afforded by this architecture allows for the use of dual fluids (e.g., immersion), where the fluids are different.

FIG. 8 illustrates a version of the AVAIL system 200 using one or more LCC systems 126a, 126b, which include heat exchangers with refrigerant on one side, and coolant on the other. As the refrigerant changes from a gas to a liquid, it releases heat, which is transferred to the coolant (heating it up). The AVAIL system 200 circulates the coolant through closed loops of, for example, heat-generating components (e.g., the drive system 104 and the battery system 106), heat exchangers (e.g., chillers 112a, 112b, radiators 108), and pumps (e.g., first screw pump (SP1) 102a, second screw pump (SP2) 102b, etc.), effectively transferring heat away from critical areas. Providing one or more LCC systems 126a, 126b and chiller 112a, 112b in each of the drivetrain loop 122a and battery loop 122b enables the AVAIL system 200 to move or dissipate heat as needed within the AVAIL system 200 depending on the heating/cooling requirements of the various BEV components. This could be used for thermal architectures with dual fluids (e.g., immersion). While LCC systems 126a, 126b offer high efficiency and scalability, they also come with challenges such as increased complexity and potential for leaks, requiring careful design and maintenance considerations.

FIG. 9 illustrates a version of the AVAIL system 200 using a separate loop for each of the drive system 104 and battery system 106. In this example, bypassing the radiator 108 is achieved by turning off the chiller 112a (e.g., turning off its fan) and closing the active aero of the LCC system 126a. Flow through the battery system 106 and drive system 104 can be reversed to stage the temperature increase of the coolant as it passes through the LCC 126a, chiller 112a, radiator 108, and drive system 104. Additionally, the separation afforded by this architecture allows for the use of dual fluids (e.g., immersion), where the fluids are different.

In some examples, artificial intelligence (AI) can be used to detect a pump state and/or a flow loop status to avoid cross-loop flow leakage. For instance, in certain architectures, if the battery system 106 pump is not operating at a sufficiently high pressure, some fluid flow can occur through the check valves that separate the battery loop 122b of the battery system 106 and the drivetrain loop 122a of the drive system 104. Further, a level sensor can be provided in the coolant tank to detect any imbalance, where a dual-chamber tank would show different levels. Furthermore, while the various architectures allow for a radiator 108 bypass state—where the radiator 108 is excluded from the system—this bypass state can be omitted, resulting in an active aero/fan-off radiator 108 mode. Additionally, a pure two-loop system with refrigerant-side complexity can be employed to manage heat transfer effectively.

While the various examples describe use of a screw pump to provide bi-directional control, it is contemplated that, instead of a screw pump, two conventional pumps can be couples in parallel (but oriented in opposite directions) to achieve bidirectionality. This, however, would increase the number of components, complexity, and cost of the overall system as compared to using a single screw pump.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. An actuated valveless architecture system for regulating temperature in a vehicle having a battery system and a drive system, the actuated valveless architecture system comprising:
   a first bi-directional control pump;
   a second bi-directional control pump;
   a plurality of check valves fluidically coupled with at least one of the first bi-directional control pump and the second bi-directional control pump;
   a radiator; and
   a chiller,
      wherein the plurality of check valves, the first bi-directional control pump, and the second bi-directional control pump are configured to define a battery loop configured to regulate temperature of the battery system and a drivetrain loop configured to regulate temperature of the drive system,
      wherein the plurality of check valves comprises a first check valve, a second check valve, a third check valve, and a fourth check valve, and
      wherein the first check valve is configured to prevent coolant backflow from the radiator to the first bi-directional control pump.

2. The actuated valveless architecture system of claim 1, wherein each of the plurality of check valves is a passive valve.

3. The actuated valveless architecture system of claim 1, wherein the first bi-directional control pump and the second bi-directional control pump are configured to be independently controlled and to alternate between an off state, a first direction, and a second direction opposite the first direction.

4. The actuated valveless architecture system of claim 1, wherein the battery loop includes the chiller.

5. The actuated valveless architecture system of claim 1, wherein the drivetrain loop includes the radiator.

6. The actuated valveless architecture system of claim 1, wherein the first bi-directional control pump and the second bi-directional control pump are configured to direct coolant flow selectively through the chiller and the radiator.

7. The actuated valveless architecture system of claim 1, further comprising a positive temperature coefficient (PTC) heater, wherein the battery loop includes the PTC heater.

8. The actuated valveless architecture system of claim 1, wherein the second check valve is configured to prevent coolant flow from the first bi-directional control pump and divert coolant through the first check valve toward the radiator.

9. The actuated valveless architecture system of claim 8, wherein the third check valve is configured to prevent coolant backflow from the chiller toward the second bi-directional control pump.

10. The actuated valveless architecture system of claim 9, wherein the fourth check valve is configured to prevent coolant flow from the second bi-directional control pump and divert coolant through the third check valve toward the chiller.

11. The actuated valveless architecture system of claim 1, wherein the first bi-directional control pump and the second bi-directional control pump are configured, via one or more check valves of the plurality of check valves, to restrict flow through the drive system to one-way flow.

12. The actuated valveless architecture system of claim 1, wherein the first bi-directional control pump and the second bi-directional control pump are configured to be controlled via a control system having a processor operatively coupled to a memory device.

13. The actuated valveless architecture system of claim 12, wherein the control system is configured to employ artificial intelligence (AI) to monitor and control one or both of the bi-directional control pump and the second bi-directional control pump.

14. An actuated valveless architecture system for regulating temperature in a vehicle having a battery system and a drive system, the actuated valveless architecture system comprising:
  a first bi-directional control pump;
  a second bi-directional control pump;
  a radiator;
  a chiller,
    wherein each of the first bi-directional control pump and the second bi-directional control pump is bidirectional, and
    wherein each of the first bi-directional control pump and the second bi-directional control pump is configured to be independently controlled and to alternate between an off state, a first direction, and a second direction opposite the first direction; and
  a plurality of check valves fluidically coupled with at least one of the first bi-directional control pump and the second bi-directional control pump,
    wherein the plurality of check valves, the first bi-directional control pump, and the second bi-directional control pump are configured to define a battery loop configured to regulate temperature of the battery system and a drivetrain loop configured to regulate temperature of the drive system,
    wherein the plurality of check valves comprises a first check valve, a second check valve, a third check valve, and a fourth check valve, and
    wherein the first check valve is configured to prevent coolant backflow from the radiator to the first bi-directional control pump.

15. The actuated valveless architecture system of claim 14, wherein the first bi-directional control pump and the second bi-directional control pump are configured to direct coolant flow selectively through the chiller and the radiator.

16. The actuated valveless architecture system of claim 14, wherein the first bi-directional control pump and the second bi-directional control pump are configured, via one or more check valves of the plurality of check valves, to restrict flow through the drive system to one-way flow.

17. The actuated valveless architecture system of claim 14, wherein the second check valve is configured to prevent coolant flow from the first bi-directional control pump and divert coolant through the first check valve toward the radiator.

18. The actuated valveless architecture system of claim 17, wherein the third check valve is configured to prevent coolant backflow from the chiller toward the second bi-directional control pump.

19. The actuated valveless architecture system of claim 18, wherein the fourth check valve is configured to prevent coolant flow from the second bi-directional control pump and divert coolant through the third check valve toward the chiller.

* * * * *